Jan. 17, 1933.  G. S. KNICKERBOCKER  1,894,619
VEHICLE WITH ENDLESS TRACK TENSIONING MEANS
Filed May 16, 1931  3 Sheets-Sheet 3

INVENTOR
GEORGE S. KNICKERBOCKER
BY
Reif & Spaddock
ATTORNEYS

Patented Jan. 17, 1933

1,894,619

UNITED STATES PATENT OFFICE

GEORGE S. KNICKERBOCKER, OF MINNEAPOLIS, MINNESOTA

VEHICLE WITH ENDLESS TRACK TENSIONING MEANS

Application filed May 16, 1931. Serial No. 537,799.

This invention relates to a vehicle, and particularly to a vehicle adapted to travel over snow, ice and rough ground, as well as on ordinary roads, and comprising a frame with propelling means therefor. While the device might take several forms, it preferably is used in connection with a vehicle in the form of a sled, and the propelling means used are preferably in the form of endless tracks. These tracks are movable vertically relatively to the frame about an axis adjacent one end thereof. It has been found that it is desirable to move the upper and lower runs of said tracks at certain times in the operation of said vehicle.

It is an object of this invention, therefore, to provide a vehicle having a frame adapted to carry the load and having a propelling means in the form of an endless track which is swingable vertically relatively to said frame, together with means for engaging the track at an intermediate point and depressing the same.

It is a further object of the invention to provide a vehicle having a frame adapted to carry the load and having a propelling means in the form of an endless track running over sprockets, said track being swingable about the axis of one of said sprockets, a member being provided between the upper and lower runs of said tracks and engageable with the inner side of said track, with means for moving said member to swing the upper or lower runs of the tracks out of a line extending between the peripheries of said sprockets.

It is another object of the invention to provide a vehicle comprising a frame adapted to carry the load, a track frame swingable about an axis extending transversely of said frame adjacent its front end, spaced sprockets carried by said track frame, an endless track running over said sprockets, a member disposed between the upper and lower runs of said track, together with means for swinging said track frame downwardly relatively to said first mentioned frame, and simultaneously moving said member to engage the upper or lower run of the track and move the same out of a line extending between the peripheries of said sprockets.

It is more specifically an object of the invention to provide a vehicle having a main frame, a shaft extending transversely of said frame, a track frame swingable about the axis of said shaft, spaced sprockets mounted in said track frame, an endless track running over said sprockets, a cylindrical member disposed between the upper and lower runs of said track and engageable with the inner sides thereof, a swinging means carrying said cylindrical member, means mounted in the main frame and engaging the track frame to swing the same and said track, and means connecting said last two means whereby said cylindrical member is moved against the upper or lower run of said track when said track frame is swung.

These and other objects and advantages of the invention will be fully set forth in the following description made in connection with the accompanying drawings, in which like reference characters refer to similar parts throughout the several views, and in which:—

Figure 1:
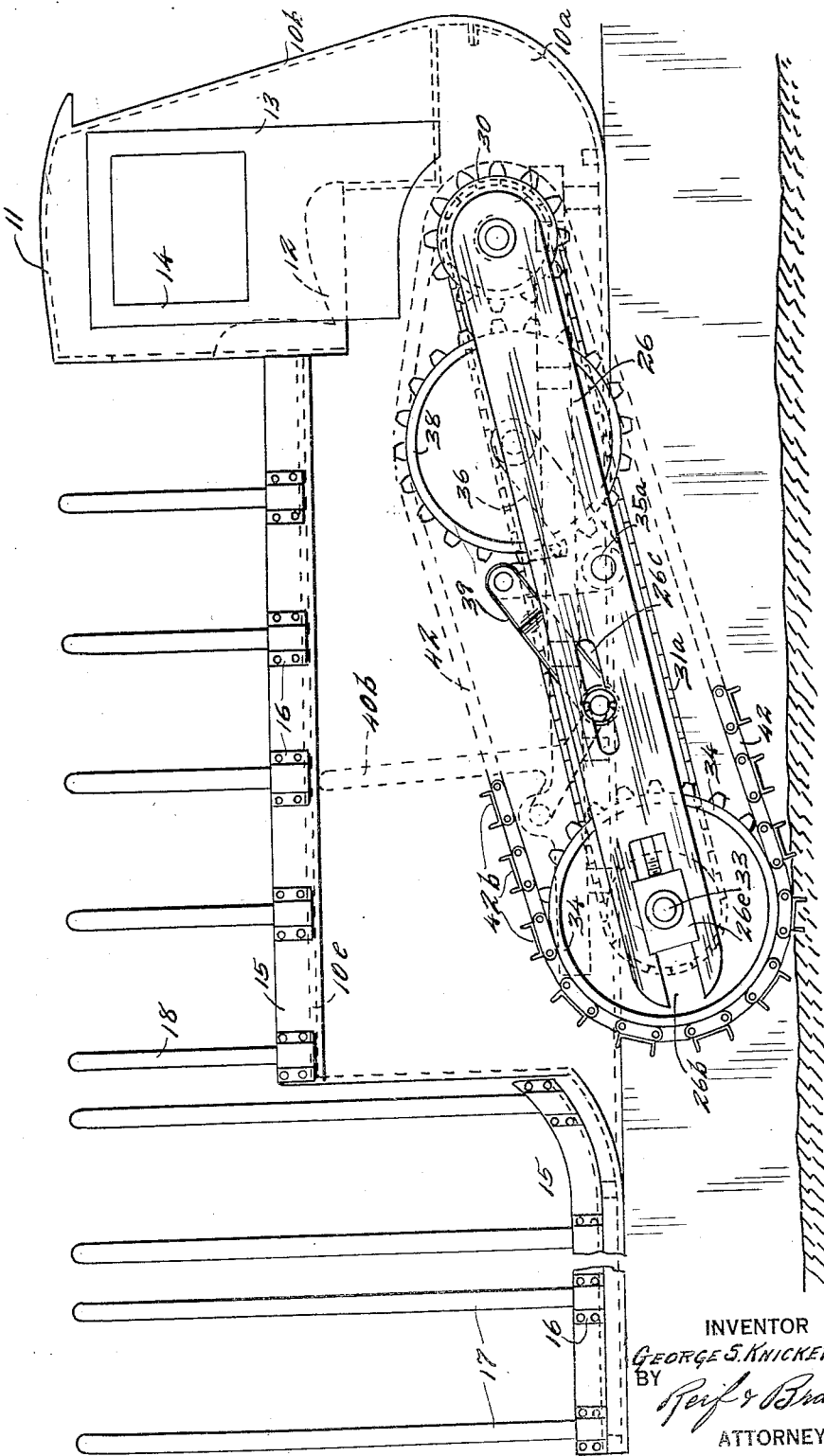
Fig. 1 is a view in side elevation of the vehicle.
Figure 2:
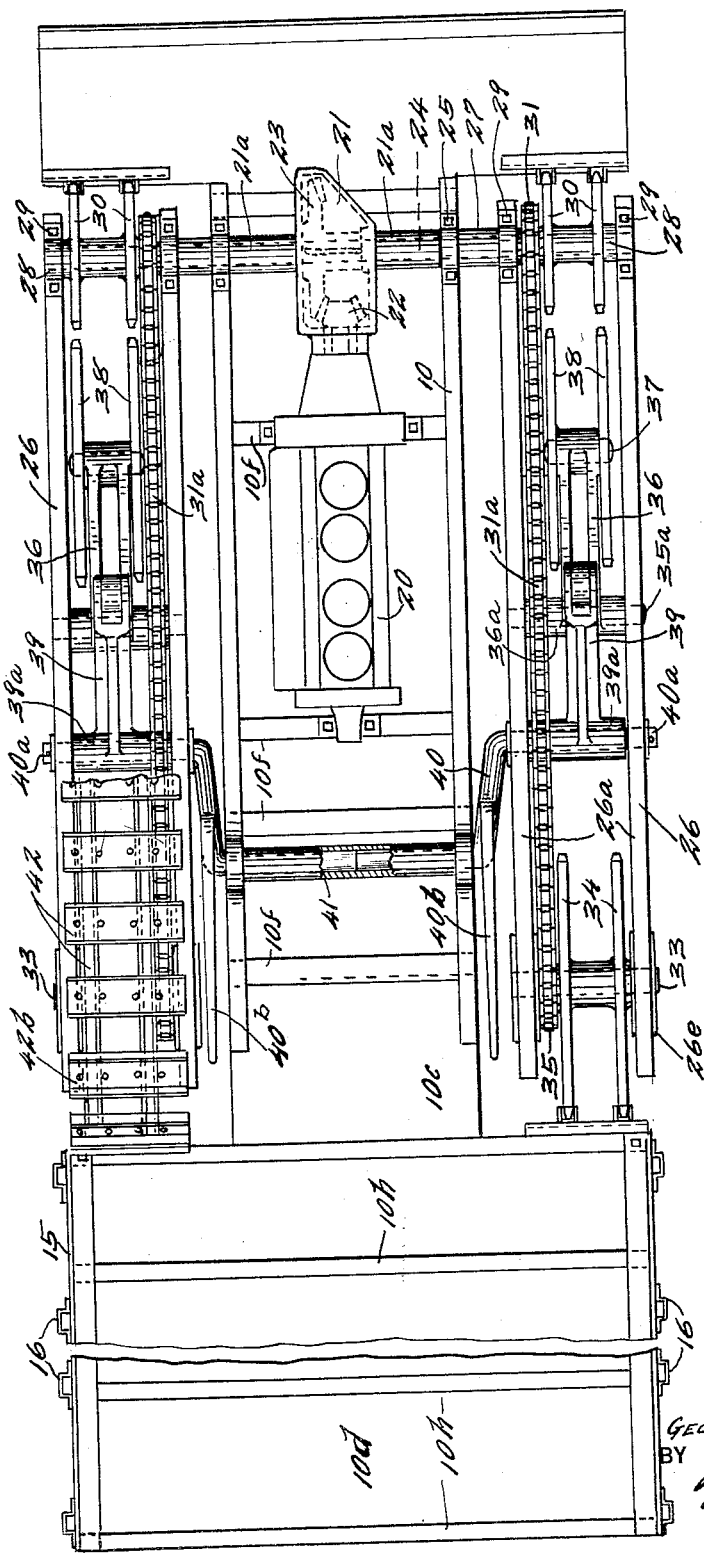
Fig. 2 is a plan view thereof, certain parts being broken away.

Referring to the drawings, a vehicle is shown comprising a main frame 10, said frame having secured thereto an upwardly curving bottom portion 10a which is continued in an upwardly and rearwardly inclined front 10b extending to the upper portion of the cab 11 disposed at the front portion of the frame carried thereby, and being equipped with a seat 12 and side doors 13 shown as having therein a window opening 14. The central portion of the frame has a bottom portion 10c which is continuous with and flush with the bottom portion 10a, and the rear of the vehicle has a bottom portion 10d at the same level. Cross timbers 10h extend transversely of portions 10c and 10d. The vehicle has horizontal portions or plates 10e extending at each side from the central portions 10c at considerable elevation, so as to be above the track frames to be later described. The side portions and the portions at the rear of the vehicle have angle irons 15 secured thereto to the outer sides of which are secured brackets 16 adapted to receive the stakes 17 and 18, the stakes extending to substantially the same height, and the stakes 18 thus being considerably shorter than the stakes 17. The frame 10 has cross members 10f, to a pair of which are secured a motor 20 illustrated as of the internal combustion type. A gear casing 21 is secured to the front of the motor 20 and a beveled gear 22 is secured to the front portion of the crank shaft of motor 20, the same meshing with another gear 23, said gears being disposed in the frame or casing 21. Casing 21 has bearing portions 21a extending at either side thereof, and a shaft 24 is journaled in and extends through said bearings and frame 21, said gear 23 being keyed to shaft 24. Bearings 21a have flanges at their ends secured to the main frame 10 by headed and nutted bolts 25. The shaft 24 projects quite a distance at either side of the bearings 21a and a track frame 26 is provided at each side of the machine, the same having bearings 27 and 28 secured at the sides thereof by the bolts 29 through which shaft 24 extends, so that frame 26 is oscillatable about the axis of said shaft. The track frame 26 has spaced side members 26a and a track sprocket member 30 is journaled on shaft 24 between said side members and between bearings 27 and 28. A chain sprocket 31 at the inner side of sprocket 30 is keyed to shaft 24. The side members 26a have slots 26b formed in their rear ends and a block 26e is disposed in each of said slots having flanges extending beyond the sides of said slots and engaging the sides of said members 26a. The blocks can be moved lengthwise of the members 26a by screws 32 secured at one end in the side members 26a and threaded into said blocks at their other ends. A shaft 33 is journaled in the blocks 26e in each of said side members 26a extending through and between said blocks, and a track sprocket member 34 is secured to shaft 33, this member as well as track sprocket 30 each having spaced sprocket wheels thereon which are respectively alined longitudinally of said frame 26. The member 34 also has a chain sprocket 35 at its inner side which is alined longitudinally of the track frame 26 with the chain sprocket 31. A chain 31a runs over sprockets 31 and 35. A shaft 35a is journaled in and extends between the side members 26a and the same has journaled thereon between said side members and extending therebetween the hub 36a of a bell crank lever 36 having a forward hub in one arm in which is carried a stud 37 having secured to its ends cylindrical members 38 illustrated as in the form of track sprockets. The other arm of each bell crank lever 36 is disposed at the rear of said arm and is embraced by the forked end of a link 39, the same having a hub 39a which is journaled on the crank arm 40a of a crank member 40, said members 40 being disposed, respectively, in slots 26c in the side members 26a. The inner portions of crank members 40 are journaled in a bearing 41 extending between and secured in bosses in the side frame members 10. Each of members 40 has rigidly secured thereto and extending therefrom upwardly and rearwardly a handle or lever arm 40b. An endless track 42 extends about each set of sprocket members 30 and 34, the same being shown as composed of links 42a having the cleats 42b thereon.

In operation motor 20 will be operated and will drive shaft 24 through the gears 22 and 23. Shaft 24 will drive the chain sprockets 31 and these will in turn drive the sprockets 35. Sprockets 35 will drive the tracks 42 so that the tracks are driven from the rear end. This tends to keep the lower run of the track taut.

Figure 3:
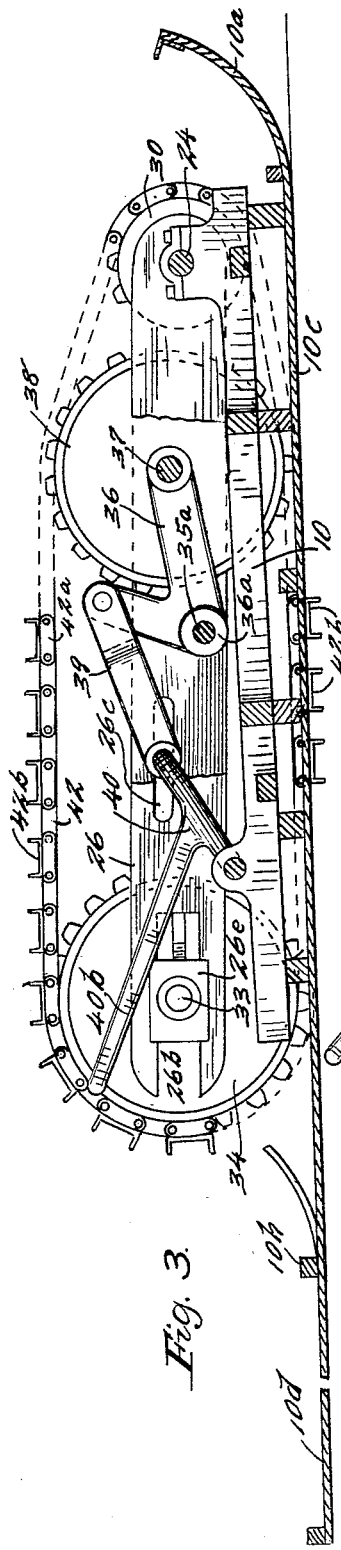
Fig. 3 is a view partly in side elevation and partly in vertical section of the track and operating parts.
Figure 4:
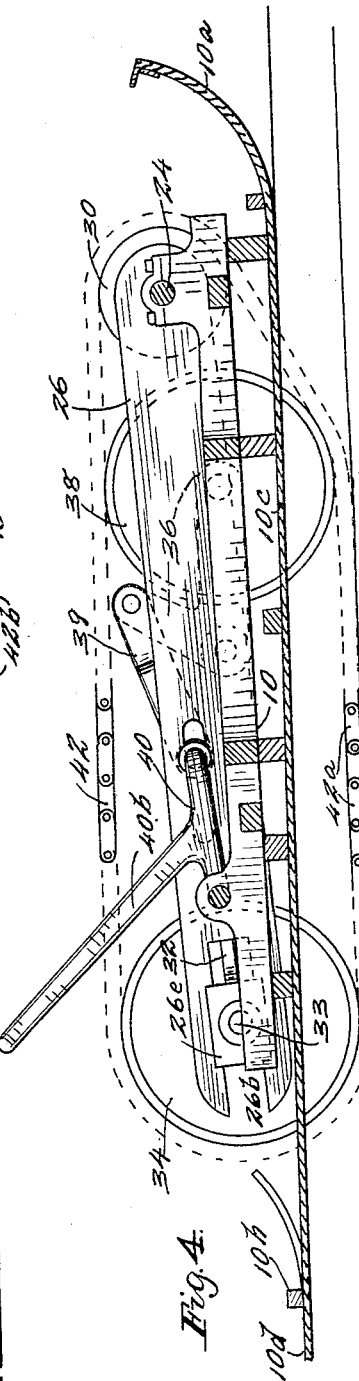
Fig. 4 is a view similar to Fig. 3, showing the parts in a different position.
Figure 5:
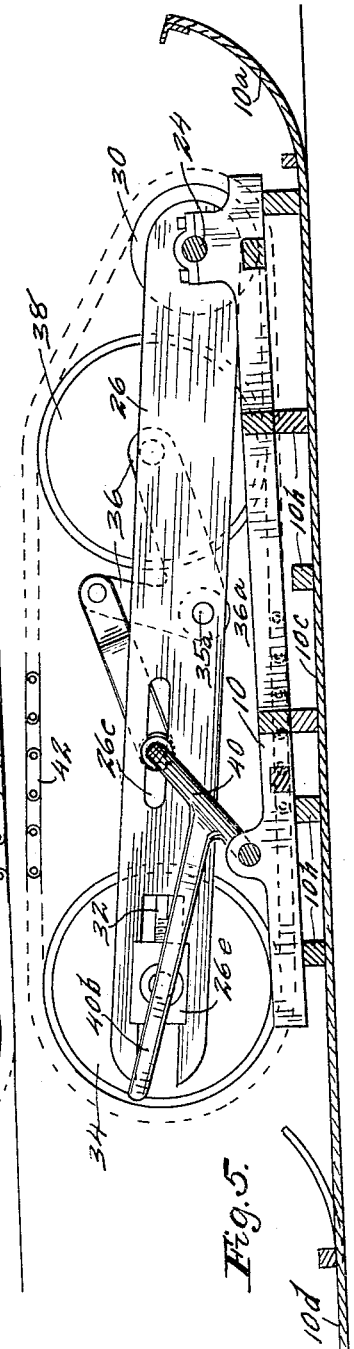
Fig. 5 is a view similar to Fig. 3, showing the parts in a still different position.

Each lever 40b can be swung as shown in Fig. 5 and in this position the track frames 26 are raised so that their top surfaces incline upwardly and rearwardly from the shaft 24. The track frames are raised to this position by the crank arms 40a and the bell crank levers 36 are moved to the position shown, by link 39 so that the members or sprockets 38 are bearing against the upper runs of the tracks 42 moving them out of a line extending tangentially to the peripheries of sprockets 30 and 34. In this position the lower run of the track is substantially parallel to the bottom of the frame portion 10c in contact with the supporting surface and it will be noted that the track is entirely off of the ground or supporting surface. The vehicle can be left in this position when standing on the snow or ice for considerable periods, as overnight, and the tread will not freeze to the supporting surface. When the vehicle is to be started or moved on a comparatively level surface, each lever 40b will be swung slightly upwardly and the parts will take the position shown in Fig. 3. In this position the lower runs of the tracks have been brought down substantially to the level of frame portion 10c in contact with the supporting surface and the cleats 42b are in position to bite into the supporting surface and afford traction. If additional traction is needed, the levers 40b will be swung further upwardly to the position shown in Fig. 4. This swings the track frames 26 to positions to incline downwardly and rearwardly and bell crank levers 36 are moved by the links 39 to swing the sprockets 38 downwardly against the lower runs of the tracks 42 so that the tracks are pushed out of alinement with or below a line extending between the peripheries or tangent to the peripheries of the sprockets 30 and 34. This results in having a larger portion of the track tread in engagement with the supporting surface. If the track were swung downwardly and extended tangentially between the sprockets 30 and 34, the track would only engage the supporting surface adjacent the rear sprocket 34. The action of members 38 gives a much greater area of support for the track and as stated, results in much greater traction. The levers 40b can be swung to almost vertical position as shown in Fig. 1 and thus swings the track frames downwardly so that they incline at quite a decided angle downwardly and rearwardly from shaft 24 and since the crank arms 40a have been moved to a position in which they move towards the rear, the front ends of bell crank levers 36 are again moved upwardly and members 38 engage the upper runs of the tracks, moving the same out of a line tangent to the front and rear track sprockets. The tracks now take the position shown in Fig. 1 and the lower runs of the tracks are kept taut. This is a position used where a soft supporting surface is encountered, as when the device would be operating in a drift or in soft mud. The track might not progress rapidly and would tend to dig a hole in the supporting surface. The track can then be lowered and sufficient traction secured to advance the vehicle.

The levers 40b while being used to move the tracks to give additional traction, can also be used to move the tracks so that one will be moved downward more than the other. This will give increased traction on one side of the vehicle and will result in the vehicle turning. One lever, of course, can be thrown to the position shown in Figs. 3 and 4, and the other lever can be thrown to the position shown in Fig. 5. The vehicle will then turn toward the side in which the track is depressed. This is the only means provided for turning the vehicle. Means, not shown, may also be provided for holding the levers 40b in various positions.

From the above description it is seen that applicant has provided a very simple and yet very efficient type of vehicle. The vehicle is designed to carry heavy loads, such as supplies, over rough roads or open country. In some of the mining districts in the northwest and in Canada, the roads are such that ordinary vehicles cannot pass over the same in winter time. Such a vehicle as described can be used to carry supplies to such inland places and the vehicle can travel partly over the roads, partly over the open ground, and over frozen lakes and rivers, where possible. The tracks at each side can be moved as described, and if the vehicle is progressing along the side of the hill, the track at the lower side of the hill could be depressed more than the track at the upper side, so that the vehicle would be kept level. The tracks could also be variously moved to pass over obstructions which might be encountered. It will be seen that the operating levers and crank shafts move the track and simultaneously move the members which operate on the track to move it out of alinement with the tangent to the sprocket wheels. As described, the vehicle can also be placed in position to stand on snow or ice without the track freezing to the supporting surfaces, and additional traction can be secured to propel the vehicle over difficult places. The structure has been demonstrated and found to work satisfactorily. It is apparent that it will have a high degree of utility for the purpose intended.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:—

1. A vehicle having in combination, a frame adapted to carry the load, an endless track carried by said frame and vertically swingable about a horizontal axis, a member disposed within said track and engaging the inner side thereof, and means for simultaneously swinging said track downwardly and swinging said member downwardly and relatively to said track to depress the lower run of said track.

2. A vehicle having in combination, a frame adapted to carry the load, an endless track at each side of said frame and having front and rear track sprockets, said tracks being vertically swingable about the axis of said front sprockets, and means for swinging said tracks downwardly about said axes and simultaneously depressing the lower run of said track below a line extending tangential to the peripheries of said sprockets.

3. A vehicle having in combination, a frame adapted to carry the load, a shaft carried by said vehicle frame, a track frame at each side of said vehicle frame journaled adjacent its front end on said shaft, front and rear track sprockets mounted in said frame, an endless track for each frame running over said track sprockets, a member disposed between the upper and lower runs of said track and engageable with the inner sides thereof, and means carried by said frame and engaging said track frame for swinging said track frame and track downwardly about the axis of said shaft, and means connecting said last mentioned means to said member for causing said member to engage said track to move the same out of the line extending tangentially to the peripheries of said sprockets.

4. A vehicle having in combination, a main frame adapted to carry the load, a shaft extending transversely of said frame, a track frame through the front end of which said shaft passes, said frame being swingable about the axis of said shaft, track sprockets carried by said track frame, an endless track running about said sprockets, a shaft journaled in said first mentioned frame and having a portion engaging said track frame to swing the same about the axis of said shaft, a member disposed between the upper and lower runs of said track, a lever fulcrumed in said main frame on which said member is carried, and means connecting said lever to said last mentioned means whereby when said track frame is swung about the axis of said shaft, said member is moved upwardly or downwardly and relatively to said track.

5. A vehicle having in combination, a frame adapted to carry the load, spaced sprockets carried by said frame, one of said sprockets being of larger diameter than the other, an endless track extending about said sprockets, a cylindrical member disposed between the upper and lower runs of said track and engaging with the inner sides thereof, means for moving said track about the axis of one of said sprockets and for moving said cylindrical member against said track to move the same out of a line extending tangentially to the peripheries of said sprockets.

6. A vehicle having in combination, a main frame, a shaft extending transversely of said frame, a track frame swingable about the axis of said shaft, spaced sprockets mounted in said track frame, one of which is journaled on said shaft, an endless track running over said sprockets, a cylindrical member disposed between the upper and lower runs of said track and engageable with the inner side thereof, swinging means carrying said cylindrical member, means mounted in said main frame and engaging said track frame for swinging the same and said track, means connecting said last two means whereby said cylindrical member is moved upwardly or downwardly and relatively to said track when said track frame is swung, and means for driving said shaft and said sprockets.

7. A vehicle having in combination, a main frame, a shaft mounted therein and extending transversely thereof adjacent the front end of said frame, a motor on said frame, means for driving said shaft from said motor, a track frame mounted on said shaft and swingable about said shaft, track sprockets carried by said track frame adjacent its front and rear ends respectively, an endless track extending about said sprockets, means for driving said sprockets from said shaft, a cylindrical member disposed between the upper and lower runs of said track, a bell crank lever in one arm of which said cylindrical member is journaled, a crank shaft having a central portion journaled in said main frame and having a crank arm engaging said track frame to move the same about the axis of said shaft, and means connecting said crank arm and said bell crank lever whereby when said crank shaft is operated, said track is raised or lowered and said cylindrical member is moved upwardly or downwardly and relatively to said track.

8. The structure set forth in claim 7, said track frame having an elongated slot extending longitudinally thereof in which said crank arm is disposed.

9. A vehicle having in combination, a main frame adapted to carry the load, a track frame mounted on said main frame and adapted to swing about a horizontal axis adjacent its front end, spaced sprockets carried by said track frame, an endless track running over said sprockets, means for driving one of said sprockets, a third sprocket disposed within and meshing with said track and between said first mentioned sprockets, and means for swinging said track frame about said axis and simultaneously raising or lowering said third sprocket and moving the same relatively to said frame.

10. A vehicle having in combination, a main frame adapted to carry the load, a track frame mounted on said main frame and adapted to swing about a horizontal axis adjacent its front end, spaced sprockets carried by said track frame, an endless track running over said sprockets, means for driving one of said sprockets, a third sprocket disposed within and meshing with said track and between said first mentioned sprockets, and means for swinging said track frame about said axis and for simultaneously moving said third sprocket upwardly or downwardly and relatively to said track.

11. A vehicle having in combination, a frame adapted to carry the load, spaced sprockets mounted on said frame, an endless track running over said sprockets, a cylindrical member disposed between the upper and lower runs of said track, means for tilting said track, and means for simultaneously moving said member upwardly or downwardly and relatively to said track.

12. A vehicle having in combination, a frame adapted to carry the load, an endless track at each side of said frame and vertically swingable about a horizontal axis, a member within said track movable toward and from the upper and lower runs thereof and relatively to said runs, and means for swinging said track about said horizontal axis and for simultaneously moving said member to depress said lower run or lift said upper run.

13. A vehicle having in combination, a frame adapted to carry the load, an endless track at each side of said frame and vertically swingable about a horizontal axis, a member within said track and engaging the upper and lower runs thereof, means for tilting said track, and means for simultaneously moving said member relatively to said track to depress said lower run or lift said upper run.

14. A vehicle having in combination, a frame adapted to carry the load, an endless track at each side of said frame and vertically swingable about a horizontal axis, a member within each track and engaging the upper and lower runs thereof, separate means for tilting each track, and means for simultaneously moving each member relatively to its corresponding track to depress the lower run or lift the upper run of said corresponding track.

GEORGE S. KNICKERBOCKER.